(12) United States Patent
Storey

(10) Patent No.: US 6,404,617 B1
(45) Date of Patent: Jun. 11, 2002

(54) CAPACITOR WITH WIDE FOIL LEADS

(76) Inventor: William T. Storey, P.O. Box 170, Dalmatia, PA (US) 17017

( * ) Notice: Subject to any disclaimer, the term of this patent is extended or adjusted under 35 U.S.C. 154(b) by 0 days.

(21) Appl. No.: 09/627,730

(22) Filed: Jul. 28, 2000

(51) Int. Cl.⁷ ............................................. H01G 4/236
(52) U.S. Cl. ..................... 361/307; 361/321.2; 361/309
(58) Field of Search .............................. 361/301.3, 302, 361/303, 307, 308.1, 309, 310, 321.2

(56) References Cited

U.S. PATENT DOCUMENTS

| | | | | |
|---|---|---|---|---|
| 3,496,435 A | * | 2/1970 | Manley ................... | 361/301.3 |
| 3,651,434 A | * | 3/1972 | McGeough et al. ........ | 333/247 |
| 4,038,587 A | * | 7/1977 | Kaliebe ................... | 361/321.1 |
| 4,307,434 A | | 12/1981 | Holtzman | |
| 4,460,622 A | * | 7/1984 | Yamaoka et al. ............. | 427/79 |
| 4,486,813 A | * | 12/1984 | Maher ..................... | 361/321.5 |
| 5,142,436 A | * | 8/1992 | Lee et al. ................... | 361/302 |
| 6,208,501 B1 | * | 3/2001 | Ingalls et al. ............... | 361/303 |

OTHER PUBLICATIONS

Publication: "Low Inductance Capacitors as EMC/EMI Filters for Low Voltage DC Applications".

* cited by examiner

Primary Examiner—Anthony Dinkins
(74) Attorney, Agent, or Firm—Thomas P. Shaffer, Esq.

(57) ABSTRACT

A capacitor which includes an electrically insulating ceramic disk having a top and bottom surface and a center axis. A first disk shaped electrode is mounted to the top surface and a second disk shaped electrode is mounted to the bottom surface of the electrically insulating ceramic disk. A first lead is connected to the first electrode and a second lead is connected to the second electrode, with the first lead and the second lead each being formed of wide flat strips of copper foil. The leads provide low inductance and allow the capacitor to safely perform at high frequencies up to 1 gigahertz. A powder coated outer layer is provided which covers the ceramic disk, first electrode and second electrode as well as a connecting end of the first lead and said second lead. Various lead orientations are disclosed. Preferably, the leads have a width in the range of 50% to 80% of the diameter of the electrically insulating ceramic disk.

2 Claims, 3 Drawing Sheets

CAPACITOR WITH WIDE FOIL LEADS

BACKGROUND OF THE INVENTION

1. Field of the Invention

The present invention relates to an improved capacitor. More specifically, it relates to improved capacitor having wide foil leads.

2. Description of the Prior Art

The use and structure of conventional powder coated disk shaped capacitors is extremely well known. Such capacitors have been routinely utilized for decades in transistor radios, televisions and a variety of electrical devices. Such capacitors, however, typically utilize some type of a wire having a circular cross sectional configuration as the leads to the capacitors electrodes. The leads are utilized to connect (often by soldering) the capacitor into the electrical circuit for which its capacitance function is needed or desired.

While such conventional disk shaped capacitors are generally effective, the use of leads having a circular cross-sectional configuration often creates inductance which precludes the capacitor from effectively operating at high frequencies up to and above 1 gigahertz. To function effectively at giga-hertz frequencies, capacitors must have minimum series inductance, otherwise they effectively become an inductor and present a high lagging rising reactance, rather that the low leading declining reactance required by the circuit. Further, because the existing practice of positioning the two round leads relatively close together in a generally parallel orientation creates difficulties in mounting the capacitor into some circuit configuration.

Holtzman, U.S. Patent suggests the use of a interconnection elements 14 and 16 (which can include a foil member) to interconnect different sections of a multi-section capacitor. The conductive sleeve 14 can be a folded piece of foil material similar to that of the capacitor electrodes and the tab 16 is a flexible foil like material. The structure of the interconnection elements 14 and 16 is best shown in FIG. 3B. To applicant's knowledge, the use of a single unfolded piece of foil as a lead for a disk shaped capacitor has never previously been proposed.

Thus, there remains a need for a disk shaped capacitor which can be safely utilized at high frequencies up to 1 gigahertz and there further remains a need for such a capacitor which has lead orientations which allow for connection to a variety of electrical circuits.

SUMMARY OF THE INVENTION

The present invention provides a disk shaped capacitor which has low impedance and can be effectively utilized at high frequencies up to 1 gigahertz. The present invention also provides a capacitor which can be formed with a variety of lead orientations to allow for easy connection to a variety of electrical circuits.

It has been well known for over a century that the self-inductance of a wide flat lead is lower than that of a thin round wire. This results since a current in round wire creates an optimum field for energy storage and hence a high inductance, whereas the current flows in a flat lead produce fields which cancel each other out, other than at the edges, and therefore have a lower capability for field energy storage and thus lower inductance.

In its simplest form, the present invention provides a capacitor comprising an electrically insulating ceramic disk having a top and bottom surface and a center axis; a first disk shaped electrode mounted to said top surface; a second disk shaped electrode mounted to said bottom surface; a first lead connected to said first electrode and a second lead connected to said second electrode, said first lead and said second lead each being formed of wide flat strips of an electrically conducting foil whereby said leads provide low inductance and allow the capacitor to effectively perform at high frequencies up to 1 gigahertz; and a powder coated outer layer covering said ceramic disk, first electrode and second electrode and a connecting end of said first lead and said second lead. As used in this patent application, a "wide" strip of electrically conducting foil shall refer to any lead which has a width dimension at least 20% of the diameter of the electrically insulating ceramic disk. As used in this patent application, a "flat" strip of electrically conducting foil shall refer to any lead which has a thickness greater than or equal to the thickness of the electrode to which it is attached.

Preferably, the electrodes are formed of palladium silver and are formed to a thickness of about 0.005 inches.

Below, a variety of lead orientations are disclosed. As will be apparent to those of skill in the art, the particular lead orientation which is preferred will depend almost entirely upon the space constraints, and locations where the leads will need to be attached to a particular electrical circuit.

In one embodiment, said first lead and said second lead extend axially outward from said first electrode and second electrode, respectively, and wherein said first lead and said second lead are situate in a single plane.

In another embodiment, said first lead and said second lead extend axially outward from said first electrode and second electrode, respectively, and wherein said first lead and said second lead are situate, respectively, in planes which are transverse to one another.

In yet another embodiment, said first lead and said second lead extend radially outward from said first electrode and second electrode, respectively, at radial angles approximately 90 degrees apart from one another and wherein said first lead and said second lead are situate, respectively, in closely spaced apart parallel planes.

In yet another embodiment, said first lead and said second lead extend radially outward from said first electrode and second electrode, respectively, at radial angles approximately 180 degrees apart from one another and wherein said first lead and said second lead are situate, respectively, in closely spaced apart parallel planes.

In the preferred embodiment of the invention said first lead and said second lead each have a width in the range of 50% to 80% of a diameter of the electrically insulating ceramic disk. Preferably, said first lead and said second lead each have a width which is approximately 70% of a diameter of the electrically insulating ceramic disk. Preferably, the foil leads are forms of copper.

DETAILED DESCRIPTION OF THE PREFERRED EMBODIMENTS

Figure 1:
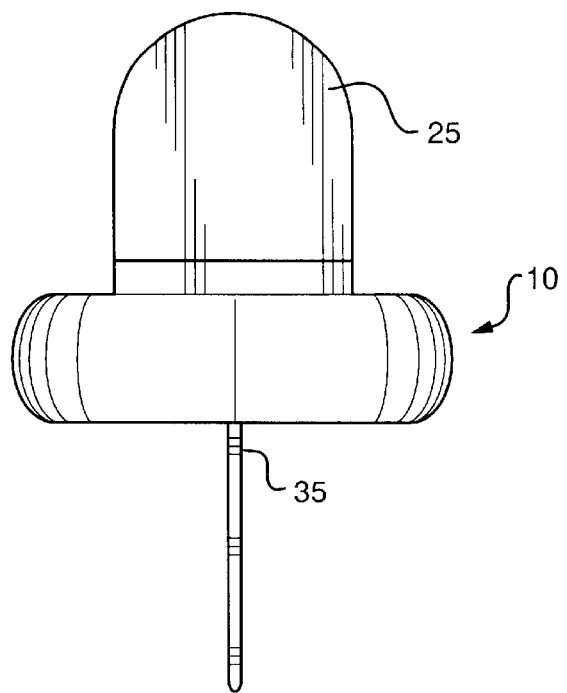
FIG. 1 is a side elevational view of the first embodiment of the present invention.
Figure 2:
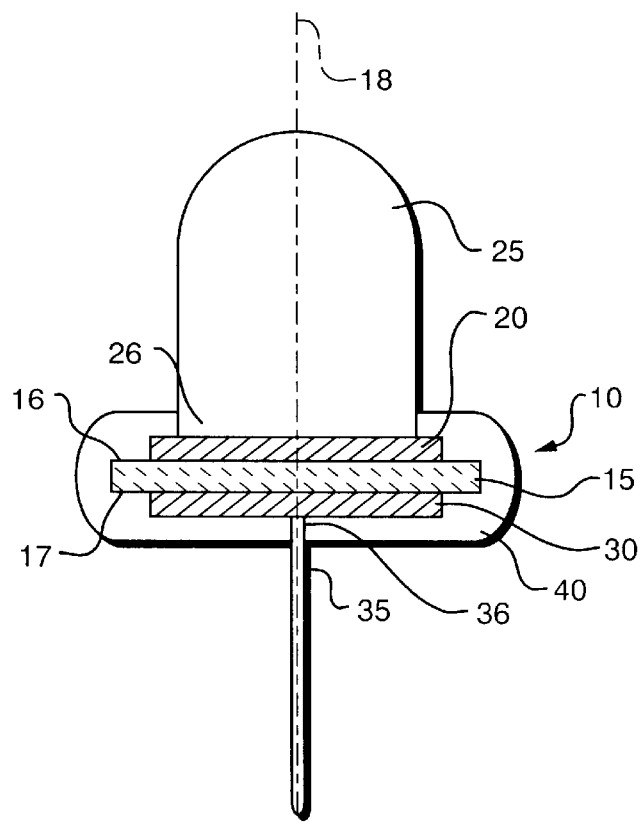
FIG. 2 is a cross sectional view of the first embodiment of the present invention shown in FIG. 1.
Figure 3:
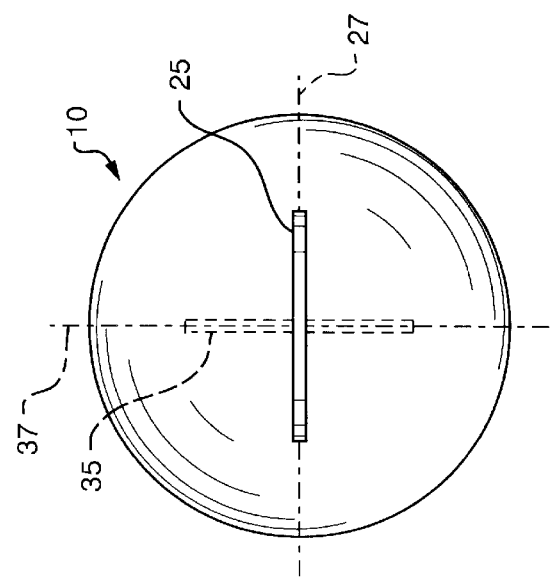
FIG. 3 is a top plan view of the first embodiment of the present invention shown in FIG. 1 with the orientation of lead 35 shown in dotted lines.

Referring to FIGS. 1 through 3, a first embodiment of the present invention is disclosed. The capacitor 10 includes an electrically insulating ceramic disk 15 having a top surface 16 and bottom surface 17 and a center axis 18. A first disk shaped electrode 20 is mounted to said top surface 16. A second disk shaped electrode 30 is mounted to said bottom surface 17. A first lead 25 is connected to said first electrode 20 and a second lead 35 is connected to said second electrode 30. Said first lead and said second lead are each formed of wide flat strips of an electrically conducting foil whereby said leads provide low inductance and allow the capacitor to effectively perform at high frequencies up to 1 gigahertz. A powder coated outer layer 40 covers said ceramic disk 15, first electrode 20 and second electrode 30 and a connecting end 26 of said first lead and a connecting end 36 of said second lead. Said electrodes 20 and 30 are preferably formed of palladium silver.

As is shown in FIGS. 1 through 3, said first lead 25 and said second lead 35 extend axially outward from said first electrode 20 and second electrode 30, respectively, and wherein said first lead and said second lead are situate, respectively, in planes which are transverse to one another. As shown, the first lead 25 and said second lead 35 each have a width which is approximately 70% of a diameter of the electrically insulating ceramic disk 15. Further, first lead 25 and said second lead 35 each have a thickness less than the thickness of the electrode (20, 30) to which they are attached.

Figure 5:
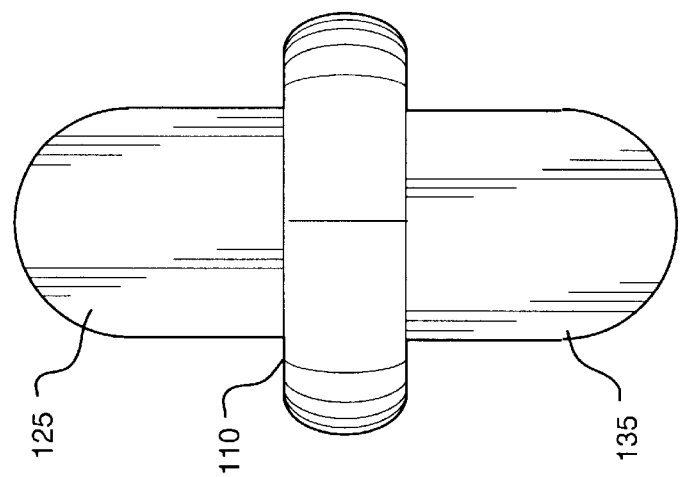
FIG. 5 is a side elevational view of the second embodiment of the present invention shown in FIG. 4.
Figure 4:
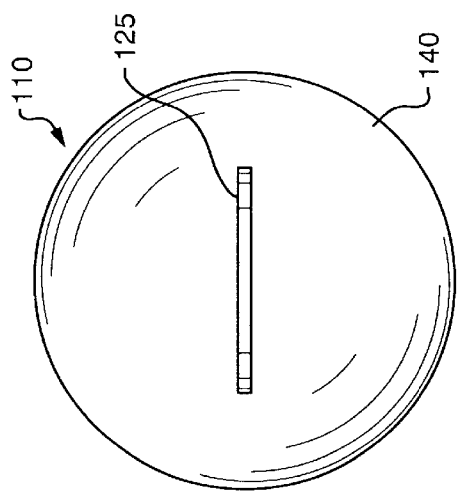
FIG. 4 is a top plan view of a second embodiment of the present invention.

FIGS. 4 and 5 show a second embodiment of the present invention wherein a first lead 125 and said second lead 135 extend axially outward in opposite directions from a first electrode and second electrode (not shown), respectively, and wherein said first lead 125 and said second lead 135 are situate substantially in a single plane (technically, said leads 125 and 135 are located in two closely spaced apart parallel planes but for purposes of this patent application such leads shall be considered to be in substantially a single plane). In the embodiment shown in FIGS. 4 and 5, all components are the same as in the embodiment show in FIGS. 1, 2 and 3 except for the orientation of the leads. Accordingly, for clarity, all like components have the same reference numbers but with the number 100 added to each reference number.

Figure 6:
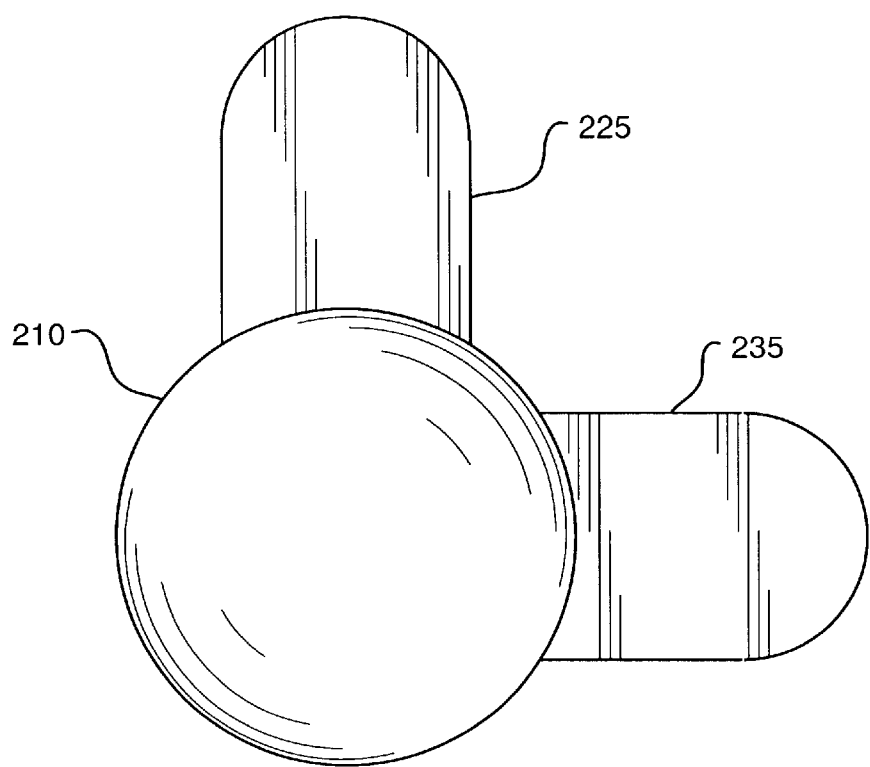
FIG. 6 is a top plan view of a third embodiment of the present invention.
Figure 7:
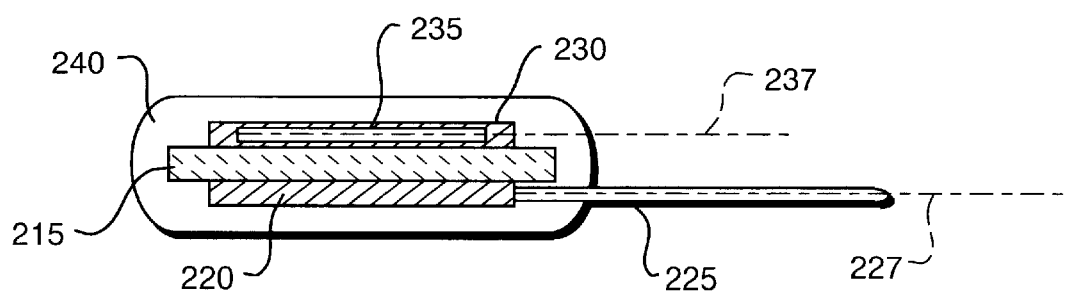
FIG. 7 is cross sectional view of the third embodiment of present invention shown in FIG. 6.

FIGS. 6 and 7 show a third embodiment of the present invention wherein a first lead 225 and said second lead 235 extend axially outward from a first electrode and second electrode (not shown), respectively, at an angle of approximately 90 degrees apart and wherein said first lead 225 and said second lead 235 are situate in a single plane (technically, said leads 225 and 235 are located in two closely spaced apart parallel planes but for purposes of this patent application such leads shall be considered to be in substantially a single plane). In the embodiment shown in FIGS. 6 and 7, all components are the same as in the embodiment shown in FIGS. 1, 2 and 3 except for, the orientation of the leads. Accordingly, for clarity, all like components have the same reference numbers but with the number 200 added to each reference number.

While I have shown and described the presently preferred embodiment of my invention, the invention is not limited thereto and may be otherwise variously practiced within the scope of the following claims.

I claim:
1. A capacitor comprising:
   a. an electrically insulating ceramic disk having a top and bottom surface and a center axis;
   b. a first disk shaped electrode mounted to said top surface;
   c. a second disk shaped electrode mounted to said bottom surface;
   d. a first lead connected to said first electrode and a second lead connected to said second electrode, said first lead and said second lead each being formed of wide flat strips of an electrically conducting foil whereby said leads provide low inductance and allow the capacitor to effectively perform at high frequencies up to 1 gigahertz, wherein said first lead and said second lead extend axially outward from said first electrode and second electrode, respectively, and wherein said first lead and said second lead are situate, respectively, in planes which are transverse to one another; and
   e. a powder coated outer layer covering said ceramic disk, first electrode and second electrode and a connecting end of said first lead and said second lead.

2. A capacitor comprising:
   a. an electrically insulating ceramic disk having a top and bottom surface and a center axis;
   b. a first disk shaped electrode mounted to said top surface;
   c. a second disk shaped electrode mounted to said bottom surface;
   d. a first lead connected to said first electrode and a second lead connected to said second electrode, said first lead and said second lead each being formed of wide flat strips of an electrically conducting foil whereby said leads provide low inductance and allow the capacitor to effectively perform at high frequencies up to 1 gigahertz, wherein said first lead and said second lead extend radially outward from said first electrode and second electrode, respectively, at radial angles approximately 90 degrees apart from one another and wherein said first lead and said second lead are situate, respectively, in closely spaced apart parallel planes; and
   e. a powder coated outer layer covering said ceramic disk, first electrode and second electrode and a connecting end of said first lead and said second lead.

* * * * *